United States Patent
Bouffay et al.

[19]

[11] Patent Number: 6,047,632
[45] Date of Patent: Apr. 11, 2000

[54] DEVICE FOR CONDENSING COOKING STEAMS AND COOKING APPARATUS COMPRISING SAME

[75] Inventors: Alain Bouffay, Hérouville Saint Clair; Guy Collas, Ifs, both of France

[73] Assignee: Moulinex S.A., Paris, France

[21] Appl. No.: 09/202,721

[22] PCT Filed: Jun. 13, 1997

[86] PCT No.: PCT/FR97/01058

§ 371 Date: Feb. 19, 1999

§ 102(e) Date: Feb. 19, 1999

[87] PCT Pub. No.: WO97/49320

PCT Pub. Date: Dec. 31, 1997

[30] Foreign Application Priority Data

Jun. 21, 1996 [FR] France .................................. 96 07725

[51] Int. Cl.[7] .............................. A47J 36/38; A47J 37/12
[52] U.S. Cl. ................................ 99/403; 99/410; 99/467; 99/473; 126/369; 219/401
[58] Field of Search .............................. 99/403, 410, 411, 99/412, 413, 414, 415, 416, 417, 418, 467, 473; 126/369, 20; 219/401; 165/104.31, 104.4, 31, 32, 39, 96, 911

[56] References Cited

U.S. PATENT DOCUMENTS

| 5,552,578 | 9/1996 | Violi ........................................ 219/401 |
| 5,657,686 | 8/1997 | Gunawardena et al. .............. 99/467 X |

FOREIGN PATENT DOCUMENTS

| 0 095 797 | 12/1983 | European Pat. Off. . |
| 2.180.637 | 11/1973 | France . |
| 2 657 765 | 8/1991 | France . |
| 85 02 304 | 7/1985 | Germany . |
| WO 91/04698 | 4/1991 | WIPO . |
| WO 94/23626 | 10/1994 | WIPO . |

*Primary Examiner*—Reginald L. Alexander
*Attorney, Agent, or Firm*—Young & Thompson

[57] ABSTRACT

The invention discloses a device for condensing steams from the vessel of a cooking apparatus, comprising a receptacle (31) containing a refrigerant (33) and in which is placed a conduit (35) comprising a steam feed inlet connected to the vessel, and an outlet for draining the condensed water. The receptacle is shaped as a sealed unitary plastic case (40) surrounding the conduit while leaving clear its inlet and outlet, the case comprising a filler neck (42) for the refrigerant which is hermetically closed by a sealing element (44).

10 Claims, 3 Drawing Sheets

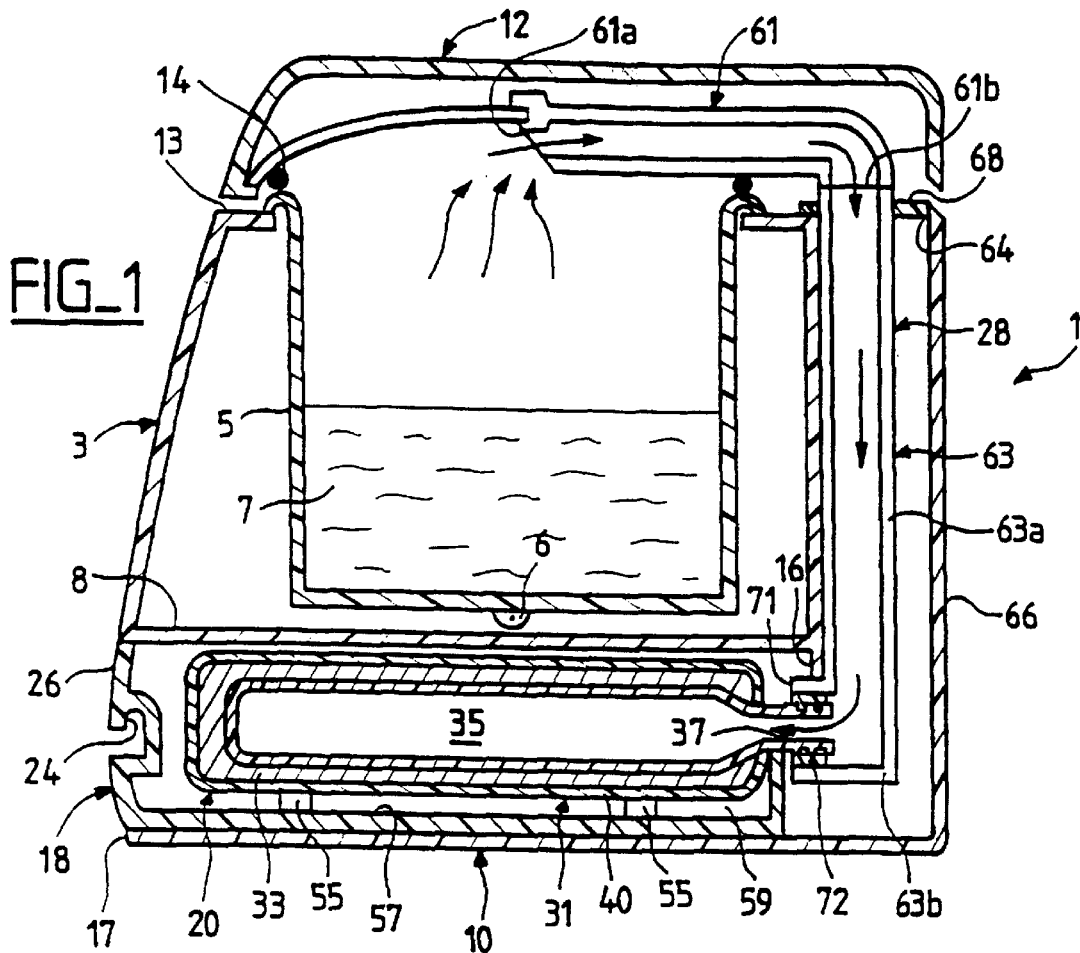
FIG_1
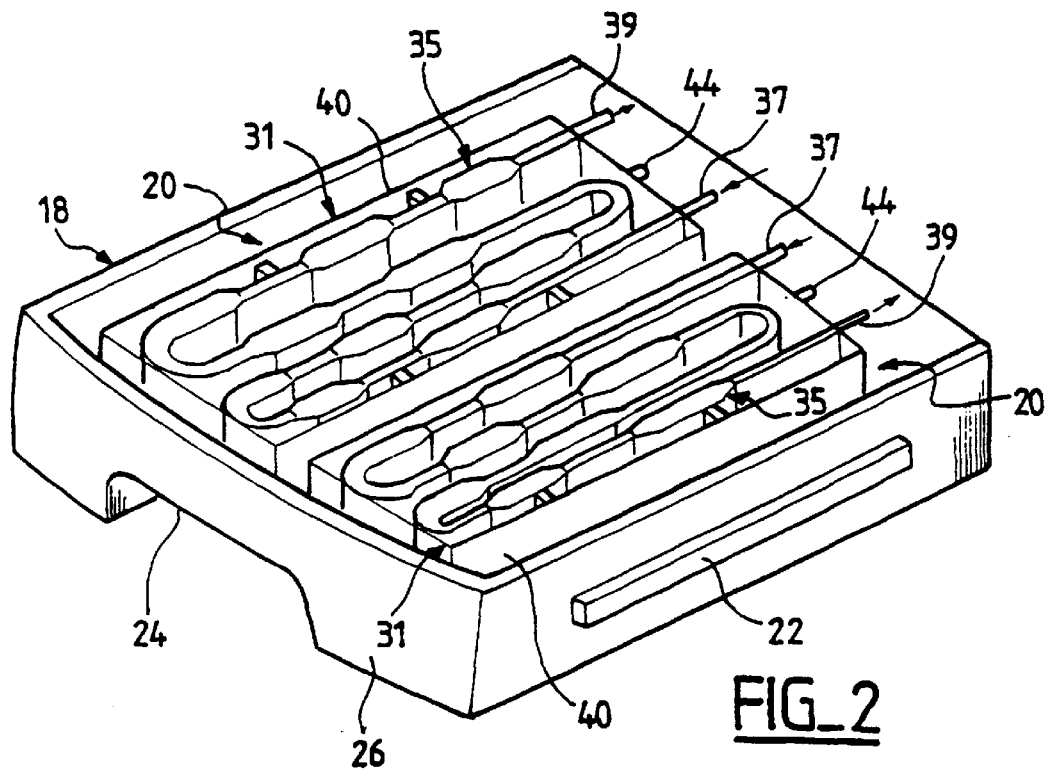
FIG_2

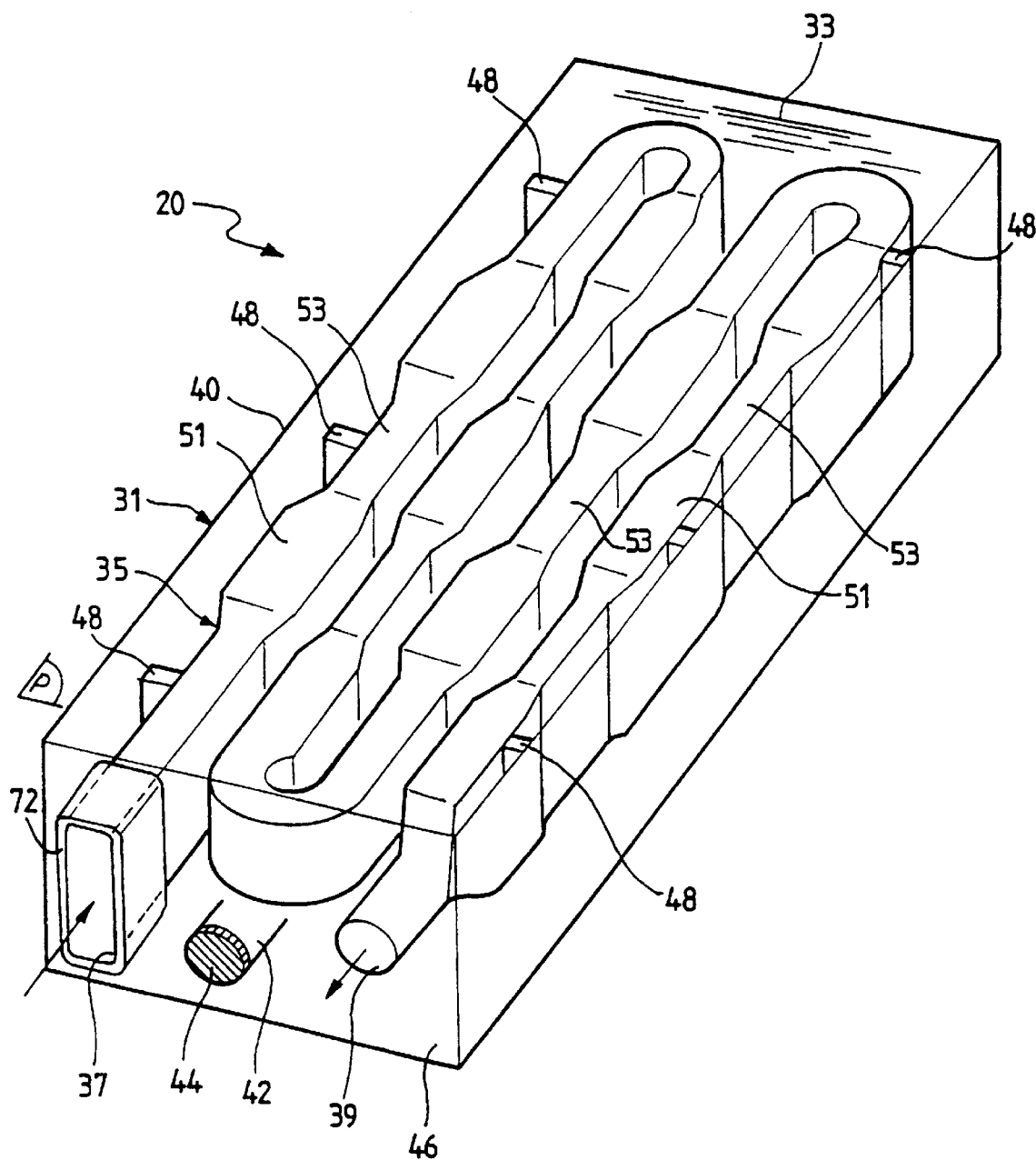

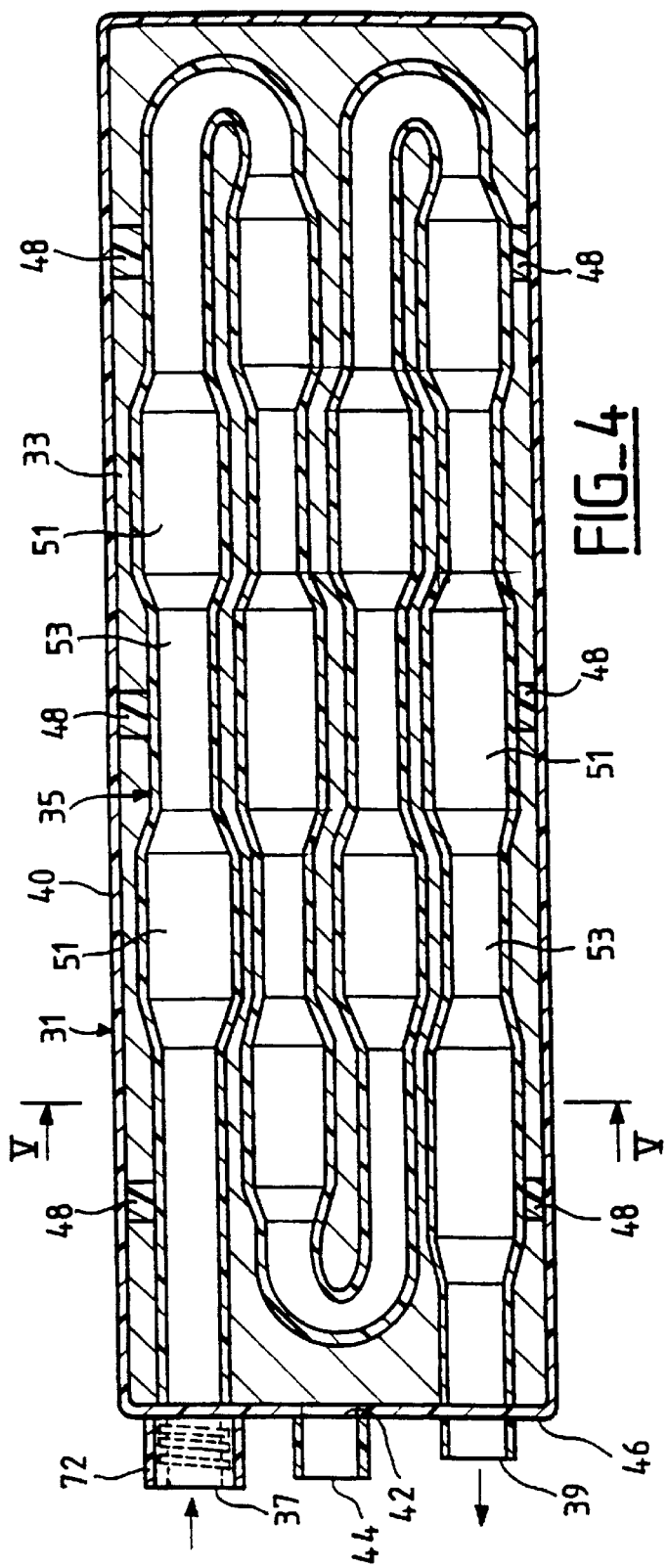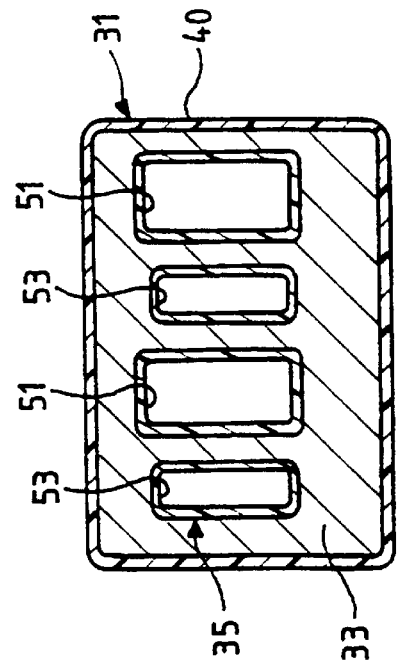

DEVICE FOR CONDENSING COOKING STEAMS AND COOKING APPARATUS COMPRISING SAME

BACKGROUND OF THE INVENTION

The present invention relates generally to cooking apparatus, such as for example household deep fat fryers, comprising a cooking vat adapted to be closed by a cover during the cooking phase, and relates more particularly to a device for condensing steam from the vat of such a cooking apparatus, this device comprising a receptacle containing a refrigerating agent and in which is disposed a conduit serving as a condensate channel comprising an inlet for steam to be condensed which passes through the receptacle and which is connected to the vat of the cooking apparatus, and a receptacle outlet and through which flows the water of condensation produced by the passage of the steam through the conduit cooled by the refrigerating agent.

It is known that for such cooking apparatus, the presence of a condensation device is particularly useful to eliminate steam containing bad smelling substances emitted in the course of cooking.

In a known condensation device of this type indicated above, of the heat exchange type, the receptacle is constituted by a cold water reservoir disposed outside on the side of the cooking apparatus, and the condenser channel is formed by a helicoidal tube disposed vertically in the reservoir and which has an inlet passing through an opening provided in the upper wall of the reservoir and is connected by tubing to the vat of the apparatus, and an outlet passing in a sealed manner through the bottom of the reservoir. Thus, during cooking, the vapors containing bad smelling substances flow through and condense in the tube cooled by the water, the condensate being collected in a collecting basin disposed below the reservoir. However, in this condensation device, the upper wall of the reservoir is constituted in fact by a cover which must be open so as to permit the introduction of the helicoidal tube into the reservoir, which complicates further the production of the reservoir. Moreover, the mounting of the helicoidal tube in the reservoir is difficult to carry out, in particularly at the level of the sealed engagement of the outlet through the bottom of the reservoir, resulting in a condensation device which is complicated to produce and cumbersome.

SUMMARY OF THE INVENTION

The invention particularly has for its object to overcome these drawbacks and to provide a device for condensing steam from a cooking apparatus, of the type described above, which will be simple to produce and low cost, and which will ensure efficient heat exchange and condensation.

According to the invention, the receptacle is shaped as a sealed casing made out of one piece of plastic material enclosing the conduit and leaving free the inlet and outlet of this latter, said casing comprising a filling opening for a refrigerating agent adapted to be closed in a sealed manner by a closure member.

Thus, the fact of making the receptacle about the conduit of a single piece, in the form of a sealed casing, permits avoiding any mounting operation of the conduit, contrary to the prior art, thereby substantially simplifying the production of the condensation device. Moreover, this production of the sealed casing enclosing the conduit permits avoiding any sealing joint at the level of the passage of the inlet and the outlet of the conduit through the casing, thereby effecting a reduction in the cost of production of the condensation device.

According to a preferred embodiment, the casing is formed by blow molding.

According to the preferred embodiment, the conduit is shaped as a serpentine formed by blow molding a plastic material.

The invention also relates to a cooking apparatus, such as for example a deep fat fryer, comprising an open housing adapted to be closed by a cover during the cooking phase and which is provided at its bottom with a base, a cooking vat disposed in the housing, and an open basin in its rear region, retractably mounted in the base of the housing and which contains at least one device for condensing cooking steam according to the invention.

BRIEF DESCRIPTION OF DRAWINGS

The characteristics and advantages of the invention will become more apparent from the description which follows, by way of non-limiting example, with reference to the accompanying drawings, in which:

FIG. 1 is a schematic vertical cross-sectional view of an electrical cooking apparatus, such as deep fat fryer, comprising two condensation devices according to the invention;

FIG. 2 is a schematic perspective view, on an enlarged scale, of a basin of the cooking apparatus of FIG. 1, in which are disposed the two condensation devices;

FIG. 3 is a perspective view, on an enlarged scale, of a condensation device;

FIG. 4 is a longitudinal cross-sectional view of the condensation device shown in FIG. 3; and FIG. 5 is a cross-sectional view on the line V—V of FIG. 4.

DETAILED DESCRIPTION OF THE PREFERRED EMBODIMENTS

The cooking apparatus 1 shown schematically in FIG. 1 is a household electrical deep fat fryer which comprises a housing or open receptacle 3, of generally substantially parallelepipedal shape, in which is disposed a metallic vat 5 adapted to be heated by electrical heating means, such as a shielded resistance 6, and containing a frying bath 7. The housing 3 is supported at its bottom 8 by a base 10, also of substantially parallelepipedal shape and preferably made of a single piece with the housing, and is adapted to be closed, during frying, by a cover 12 mounted hingedly in a removable manner on an upper edge 13 of the housing by disassembleable hinge means (not shown).

The cover 12 comprises on its internal surface a joint 13 so shaped as to effect a sealing between the vat 5 and the cover 12 when the latter is closed, as shown in FIG. 1.

The housing 3, the base 10 and the cover 12 are molded of a plastic material such for example as polypropylene which is particularly economical and easy to work with.

In the base 10 of the housing 3 is provided a recess 16 which opens at the front surface 17 of the base and in which is retractably mounted a tray or receptacle 18, better seen in FIG. 2, of parallelepipedal shape, open at its rear and at its upper side, and containing at least one steam condensation device, two in the example shown in FIG. 2, designated by the same overall reference numeral 20 in FIGS. 1, 2 and 3.

In this example, FIGS. 1 and 2, the tray 18 is shaped as a drawer which, on the one hand, is horizontally slidably mounted in the recess 16 of the base 10 by two horizontal rails 22, of which only one is shown in FIG. 2, engaging in two corresponding slideways (not shown) provided respectively on the two side walls of the recess 16, and, on the other hand, is removable. In FIGS. 1 and 2, there is shown at 24 a wide groove provided in the front surface 26 of the vat 18 and forming a gripping member adapted for withdrawing the tray.

The deep fat fryer 1, FIG. 1, also comprises conduit or connection means 28 establishing communicating between the upper volume of the vat 5 and each of the two condensation devices 20 disposed in the tray 18 (FIG. 2), and permitting the flow of steam.

As shown in FIGS. 3 and 4, each condensation device 20 comprises a receptacle 31 comprising a refrigerating agent 33 (FIG. 4) constituted in this case by ice, if desired colored by a non-toxic coloring agent, and a conduit 35 disposed in the receptacle 31 and serving as a condensate channel. The conduit 35 comprises an inlet 37 for the steam to be condensed and projects outside the reservoir 31, and an outlet 39 opening out of the reservoir 31 and through which is adapted to flow the water of condensation produced by the passage of the steam through the conduit 35 cooled by the ice.

According to the invention, the reservoir 31 is shaped as a sealed casing 40, made of a single piece of a plastic material, surrounding the conduit 35 and leaving free the inlet 37 and the outlet 39 of this latter, the casing 40 comprising an opening 42 (FIG. 4) for filling with water adapted to be closed in a sealed manner by a closure member, such as for example a plug 44.

The casing 40 is preferably made of a transparent plastic material such as for example polypropylene, and is formed either by blow molding or by molding about the conduit 35. It should be emphasized that the blow molding process has the advantage of being particularly economical.

In the embodiment shown in FIGS. 3 and 4, the casing 40 has a parallelepipedal shape and the conduit 35 is shaped as a serpentine which extends flat in a plane parallel to the longitudinal plane P of the casing and which is made either by blow molding or by molding a plastic material such as for example polypropylene. As will be seen in FIGS. 3 and 4, the inlet 37 and the outlet 39 of the conduit 35 project axially from the same lateral surface 46 of the casing 40; the water filling opening 42 is provided also in this side surface 46 of the casing, see FIG. 4.

In FIGS. 3 and 4, there is shown at 48 the small spacers of plastic material which connect the serpentine conduit 35 to the two longitudinal surfaces of the casing 40 so as to maintain the conduit correctly in place, and which are formed suitably during blow molding of the casing 40 about the conduit 35.

In this embodiment, FIGS. 3 and 4, the serpentine conduit 35 has a cross section of approximately rectangular shape, as shown in FIG. 5, and preferably comprises, in alternation over all its length, sections 51 of the same given cross section and sections 53 also of the same cross section but smaller than that of sections 51. The sections 53 thus define constrictions and are adapted to slow the speed of passage of the steam through the conduit 35 so as to increase the heat exchange time with the ice 33, and thereby to optimize the condensation of the steam.

After production in the form of a unitary assembly of the casing 40 provided with the internal conduit 35, water is poured into the casing 40 through the filling opening 22 which is then sealed hermetically by the plug 44. This assembly is then placed in the freezer of a refrigerator before use, so as to permit freezing of the water is contains.

It will be noted that a safety valve, known per se, may be arranged at the level of the filling opening 42.

With respect to FIG. 2, the two refrigerating casings 40 with an internal conduit 35 are mounted removably in the tray 18 and extend in the same longitudinal direction, parallel to each other. One of the two casings 40 is mounted reversed relative to the other casing so as to place beside each other the two steam inlets 37, as shown in FIG. 2.

The two refrigerating casings 40 with an internal conduit 35 rest on cross pieces 55 (FIG. 1) surmounting the wall of the bottom 57 of the tray 18 so as to create a lower region 59 adapted to collect the condensate flowing through the outlet 39 of each conduit 35. Preferably, the two casings 40 are slightly inclined, respectively toward the two longitudinal surfaces of the tray 18 so as to facilitate the flow of condensate through the outlet 39 of each internal conduit 35.

As shown in FIG. 1, the conduit means 28 for the cooking steam, between the vat 5 and each of the two condensation devices 20 mounted in the tray 18, comprise a first conduit 61 which is integrated into the cover 12 of the housing 3 and of which one end 61a opens into the upper volume of the vat 5, and a second conduit 63 which extends vertically through a through opening 64 provided in the housing 3, from the upper edge 13 of its rear surface 66; the conduit 63 has a joint 68 adapted to ensure sealing at the level of the opening 64. The conduit 63 has an L-shaped cross section whose vertical branch 63a passes through the opening 64 and is connected sealingly to the other end 61b of the conduit 61, and whose horizontal branch 63b is closed and comprises two openings 71 which empty into the rear region of the tray 18. To each opening 71 of the horizontal branch 63b of the conduit 63 is sealing connected the inlet 37 of the internal conduit 35 of each of the two refrigerating casings 40, which inlet 37 of the conduit 35 is provided with a sleeve forming a sealing joint 72, as shown in FIGS. 3 and 4.

Referring to FIGS. 1 and 2, the evacuation and elimination of the steam present in the fryer takes place in the following manner.

In the course of frying, the steam (indicated by the arrows) which is given off and which contains the bad smelling substances, escapes through the conduit 61, flowing downwardly through the conduit 63 and entering, via each of the two inlet openings 71, the corresponding inlet 37 of the serpentine conduit 35 of each of the two refrigerating casings 40. It then circulates through each conduit 65, being slowed by the constricted sections 53 of this latter, and condenses in the conduit 35 which is cooled by the frozen water 33; the water of condensation containing the bad smelling substances flows through the outlet 39 of each conduit 35 and falls into the collecting region 59 of the tray 18.

What is claimed is:

1. Device for condensing steam from a vat (5) of a cooking apparatus provided with a cover (12) which is closed during the cooking phase, this device comprising a receptacle (31) containing a refrigerating agent (33) and in which is disposed a conduit serving as a condensate channel (35) comprising an inlet (37) for steam to be condensed which passes through the receptacle (31) and which is connected to the vat (5) of the cooking apparatus, and an outlet (39) from the receptacle (31) and through which flows the water of condensation produced by the passage of the steam through said conduit cooled by the refrigerating agent, characterized in that the receptacle (31) is in the form of a sealed casing (40) made of a single piece of a plastic material surrounding the conduit (35) leaving free the inlet (37) and the outlet (39) of this latter, said casing (40) comprising an opening (42) for filling with a refrigerating agent adapted to be closed hermetically by a closure member (44).

2. Device according to claim 1, characterized in that the casing (40) is formed by blow molding.

3. Device according to claim 1, characterized in that the casing (40) is formed by molding.

4. Device according to claim 1, characterized in that the conduit (35) is shaped as a serpentine made by blow molding a plastic material.

5. Device according to claim 1, characterized in that the conduit (35) is shaped as a serpentine made by molding a plastic material.

6. Device according to claim 1, characterized in that the material of the conduit (35) is polypropylene.

7. Device according to claim 1, characterized in that the conduit (35) has, in alternation over all its length, first sections (51) of the same given cross section and second sections (53) of the same section but smaller than that of the first sections, these second sections (53) comprising constrictions adapted to slow the passage of the steam through the conduit (35).

8. Device according to claim 1, characterized in that the casing (40) has the shape of a parallelepipedal and the conduit (35) extends in a plane parallel to the longitudinal plane (P) of the casing (40).

9. Device according to claim 8, characterized in that the inlet (37) and the outlet (39) of the serpentine conduit (35) project from a same transverse face (46) of the parallelepipedal casing (40).

10. Cooking apparatus, such as for example a deep fat fryer, comprising an open housing (3) adapted to be closed by a cover (12) during the cooking phase and which is provided at its bottom with a base (10), a cooking vat (5) disposed in the housing (3), and a tray (18) open at its rear and mounted retractably in the base (10) of the housing, characterized in that the tray (18) contains at least one device (20) for condensing cooking steam, as defined in claim 1.

* * * * *